United States Patent [19]

Finden

[11] 4,221,273
[45] Sep. 9, 1980

[54] STEERABLE AND MOTOR-DRIVEN UNDERCARRIAGE

[75] Inventor: Per Ø. Finden, Skårer, Norway

[73] Assignee: Sentralinstitutt for Industriell Forskning, Oslo, Norway

[21] Appl. No.: 884,197

[22] Filed: Mar. 7, 1978

[30] Foreign Application Priority Data

Mar. 15, 1977 [NO] Norway ............................ 770901

[51] Int. Cl.² ............................................ B62D 61/10
[52] U.S. Cl. ........................ 180/6.48; 180/23
[58] Field of Search ............... 180/6.48, 6.5, 7 R, 180/21, 22, 23, 24, DIG. 3, 52

[56] References Cited

U.S. PATENT DOCUMENTS

| | | | |
|---|---|---|---|
| 2,362,626 | 11/1944 | Joy | 180/22 X |
| 3,700,058 | 10/1972 | Kuwahara | 180/21 |
| 3,938,608 | 2/1976 | Zambelli | 180/21 |

*Primary Examiner*—John A. Pekar
*Attorney, Agent, or Firm*—Watson, Cole, Grindle & Watson

[57] ABSTRACT

A controllable, motor-driven undercarriage which comprises a first frame having non-driven castors and a second frame carrying driving wheels. The second frame can be turned relative to the first frame for changing the direction of the driving wheels and can be locked in any position relative to the first frame. The second frame is a two-armed lever which is pivotable about a central axis and at either end carries a driving wheel which is provided with an independently controllable driving means. The independently controllable driving-wheels are used both for the driving and steering of the undercarriage and for swinging the lever between different locked positions.

11 Claims, 6 Drawing Figures a
STEERABLE AND MOTOR-DRIVEN UNDERCARRIAGE

BACKGROUND OF THE INVENTION

1. Field of the Art

The present invention relates to a controllable, motor-driven undercarriage, comprising a first frame having freely rotatable supporting wheels and a second frame having driving wheels, said frames being adapted for relative motion and being locked in various relative positions.

2. Statement of the Prior Art

The invention relates to undercarriages in general, but has found particular application in connection with wheeled chairs, drivable beds, warehouse waggons, and trucks. In the following the invention will be described in association with wheeled chairs, but it is to be understood that the undercarriage is not limited to such vehicles.

A known wheeled chair such as that disclosed in U.S. Pat. No. 3,920,093, comprises a lower rectangular frame having a freely rotatable non-driven supporting wheel at each corner. A vertical shaft extends through the center of the frame, the shaft at its lower end carrying a driving wheel and at its upper end carrying a seat on which the user may sit. At the level of the seat there is provided a horizontal tube-formed gripping ring which is carried by substantially vertical struts attached to the frame. The wheeled chair is so designed that the seat, the driving wheel and the supporting wheels can swing concurrently relative to the frame, a fact which entails that all the wheels and the seat always point in the same direction.

The known chair can be rotated 360° on the spot, and theoretically it can be driven in any direction in which the seat and the wheels are pointing.

When driving the chair the user must produce a relative swinging movement between the frame and the seat in order to change the driving direction of the chair. The user must then grip the gripping ring and swing both himself and the seat until he or she adopts the position in which the wheeled chair is to be driven.

A disadvantage of such a known wheeled chair is the need for a comparatively large manual force to effect the relative swinging movement between the wheels and the frame, a fact which is especially unfavourable for users having a small physical strength. Further, such a wheeled chair will, when driven from one place to another, require that the user maintains a firm grip on the gripping ring to avoid undesired relative movements between the frame and the seat, such an undesired relative movement easily leading to unstable and wavy driving.

From U.S. Pat. No. 1,311,726 there is known a tractor which comprises four freely rotatable non-driven supporting wheels, but the function thereof is primarily to stabilize the normal direction of travel of the tractor, that is straight forward or straight backward. The tractor also comprises two driving wheels mounted on an inner annular frame which can be rotated relative to an outer frame on which the freely rotatable supporting wheels are mounted. It is possible to drive the tractor sideways, but then the inner frame must be manually rotated the desired angle whilst the tractor remains at rest, and the driving of the tractor cannot be resumed before the driving wheels have taken the position which determines the direction in which the tractor has to be driven.

U.S. Pat. No. 2,874,791 discloses a unit having driving wheels driven by individual reversible motors. However, the reversible motors are mounted on a frame which cannot be rotated relative to the main unit in which the frame is mounted. Accordingly, this known unit cannot be driven in a sideways direction.

A motor-driven wheeled vehicle is known from U.S. Pat. No. 3,404,746 in which a frame carries supporting wheels and driving wheels. However, all the supporting wheels are not freely rotatable, and only one driving wheel is mounted on the frame. It is true that a sideways driving can be accomplished with the vehicle according to this patent specification but two of the supporting wheels must then be swiveled by a winding handle and locked in a given position. When an opposite sideways driving is to be effected, the two mentioned supporting wheels must be released and the two remaining wheels swiveled and locked in a predetermined position.

SUMMARY OF THE INVENTION

The object of the present invention is to provide a drivable vehicle or chair which can be driven not only straight forward or backward but also around and sideways, said driving motions being chosen independently of the position held by the user or driver.

In an undercarriage of the type disclosed in the preamble the second frame is a two-armed level which at each end carries a driving wheel provided with an independently controllable driving means, and which by the controllable driving means is pivotable about a vertical center axis between various lockable positions relative to the first frame. When the lever is locked and the driving wheels are driven synchronously in the same direction an approximately straight forward or backward movement of the chair is achieved. When the driving wheels are driven nonsynchronously or synchronously but in opposite directions a turning of the frame and thereby the seat is obtained if the lever is locked. However, if the lever is released, whereupon the driving wheels are operated in opposite directions, the lever will be turned relative to the frame, for example to a new position in which it is relocked. A change of position of the driving wheels relative to the driver's seat and the frame is then achieved. Subsequent to the locking of the lever in its new position the driving of the chair may continue. If the lever is locked in a position in which it has been turned 90°, the chair will upon synchronous operation of the driving wheels be displaced laterally, for example along a worktable or a storage rack.

Further features and advantages of the present invention will appear from the following description, reference being had to the drawing which illustrates an embodiment of the subject matter of the invention.

DESCRIPTION OF A PREFERRED EMBODIMENT

Figure 1:
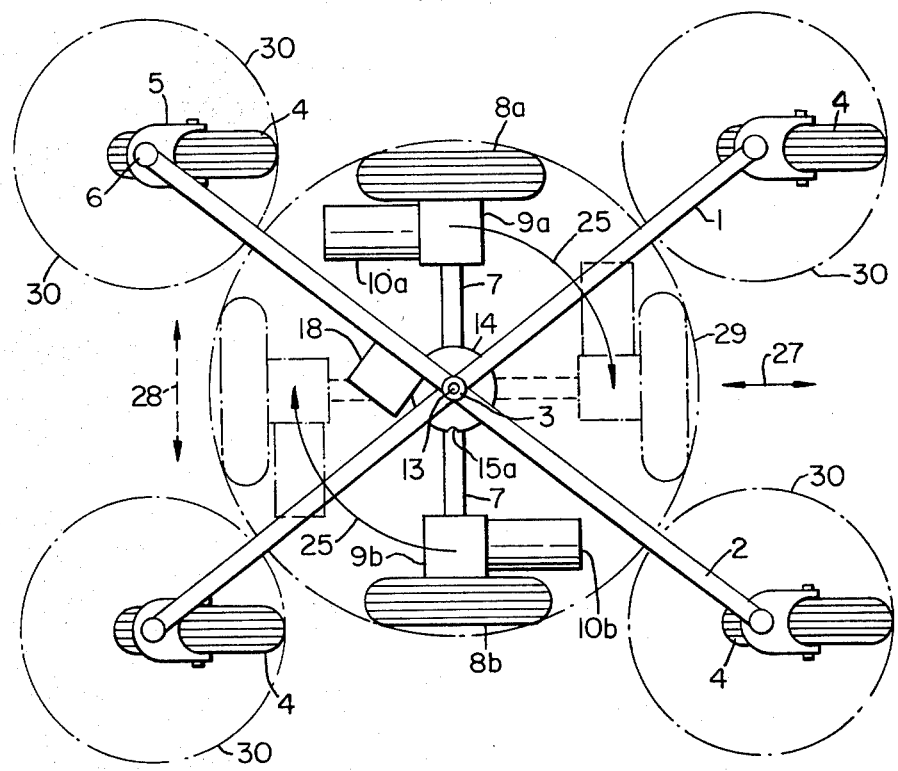
FIG. 1 is a plan view of an embodiment of the undercarriage according to the invention.
Figure 2:
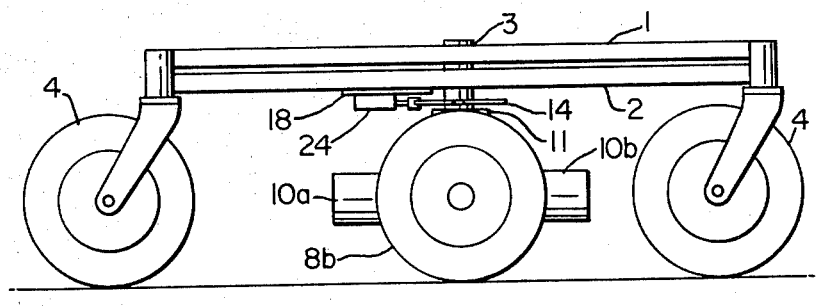
FIG. 2 is an elevational view of the undercarriage of FIG. 1 with the supporting wheels turned 180°.

In FIGS. 1 and 2, which are plan and elevational views, respectively, of an embodiment of the invention, 1 and 2 denote elongated structural members which at their centres are attached to a sleeve 3 which will be discussed further in connection with FIGS. 3 and 4. The structural members 1 and 2 constitute an undercarriage or a chassis frame. At each free end of the structural members 1 and 2 there is mounted a freely rotatable non-driven wheel 4, each wheel being mounted in a journal bearing 6 via mounting straddles 5. The wheels 4 serve as supporting wheels for the frame and operate as castor wheels for the driving thereof.

In the sleeve or the hub 3 there is rotatably mounted a shaft 13 which at its lower end carries a two-armed lever 7 which at each end carries a driving wheel 8a and 8b, respectively. The latter are via individual power transmissions 9a, 9b connected to separate driving motors 10a, 10b. The driving motors 10a and 10b, which may for example be electric motors, can be independently controllable by appropriate control means (not shown). The power to the electric motors 10a and 10b can be supplied from batteries (not shown) which may be mounted on the structural members 1 and 2. To these members may also be attached a seat (not shown) on which the user of the undercarriage can sit.

Figure 3:
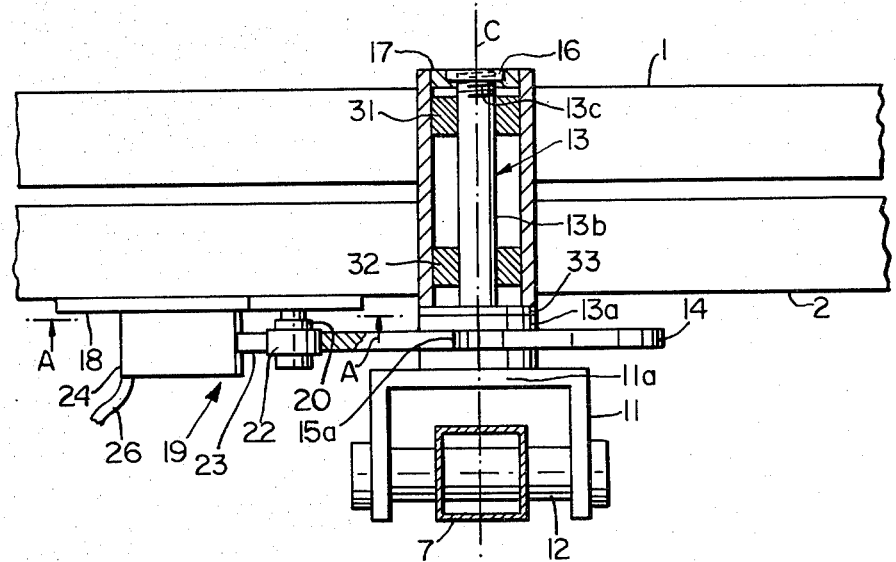
FIG. 3 is a view on a larger scale and partially in section of details in the area of the turning axis of the lever.
Figure 4:
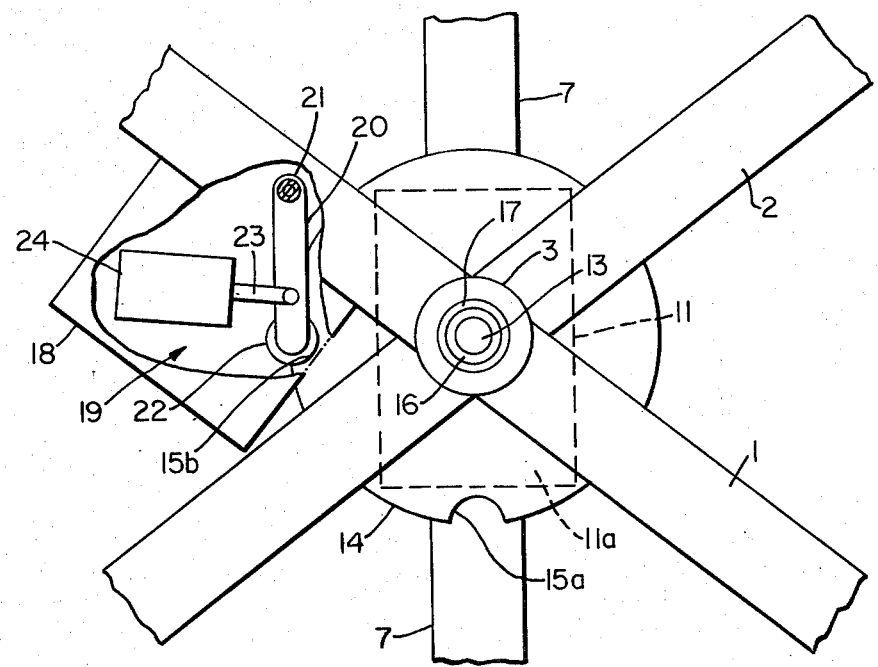
FIG. 4 is a plan view of the details of FIG. 3, partially in section along the line A—A.

As illustrated in detail in FIG. 3 the two-armed lever or driving wheel shaft 7 may take the form of a square tube attached to a U-shaped mounting straddle 11 by a through-going bolt 12, the web portion 11a of the U-shaped mounting straddle 11 being secured to the lower end of the shaft 13. The mounting straddle 11 is of the size as indicated in dotted lines in FIG. 4, and the lever or the driving wheel shaft 7 can swing about the bolt 12 until it abuts against the marginal edge at the end of the web portion 11a.

The shaft 13 comprises a lower, thick portion 13a, an intermediate stepped portion 13b and an upper threaded portion 13c. The lower portion 13a of the shaft 13 carries a disc 14 provided with two circumferential notches 15a and 15b spaced 90° apart. The intermediate stepped portion 13b of the shaft 13 extends through the sleeve or the hub 3 and is supported in two supporting bearings 31 and 32, whereas a ring 16 is screwed on to the upper threaded portion 13c of the shaft 13, said ring resting on a stepped annular flange 17 in the upper portion sleeve 3 for sealing the sleeve. A sliding thrust bearing 33 which carries the load on the undercarriage via the structural members 1 and 2 and the sleeve 3, is mounted on the shaft 13 at the junction between the thick portion 13a and the stepped portion 13b.

To the lower side of the structural member 2 there is attached a plate 18 carrying a locking means which is generally designated 19, and which comprises a manoeuvrable locking arm 20 which at one end 21 is pivotally mounted on the structural member 1 and at the other end carries an annular locking disc 22 matching the previously discussed notches 15a, 15b. Via an actuating arm 23 the locking arm 20 is operated by a controllable actuating means 24, for example an electromagnet. The electromagnet may be activated by a user to bring the locking arm 20 into or out of engagement with a notch 15a, 15b which registers with the disc 22. When the locking disc 22 is pulled out of engagement with the notch 15a the lever 7 can be turned in the direction of the arrows 25 to the position indicated in dotted lines in FIG. 1, wherein the notch 15a registers with the locking disc 22. Preferably the actuating arm 23 operates against a spring force which maintains the locking disc 22 in positive engagement with a notch 15a, 15b, or in contact with the disc 14 during rotation thereof, so that the locking disc 22 will automatically engage a notch 15a, 15b as soon as the notch registers with the locking disc.

In FIG. 3 there is indicated a current conductor 26 to the electromagnet 24. The current supply may be controlled from a control or switch means which is operated by the user. Such a control means may consist of a switch and a control handle. Depending upon the position to which the switch is switched, the switch will effect a release of the driving wheel shaft 7 and a turning thereof to a new position in which the shaft 7 is relocked. During such a turning of the driving wheel shaft 7 the steering mechanism controlled by the control handle will be disconnected. When the driving wheel shaft 7 has reached its new, locked position the control handle may once again come into effect and impart to the undercarriage the driving movements called for by the user. The control handle may be of the type which when not influenced takes a vertical, neutral position, and which in any inclined position transmits more or less current to the driving motors.

Since the two-armed lever 7 is provided with driving wheels which can be controlled independently both in respect of the direction of rotation and the speed there may be achieved a series of driving possibilities depending on the speed of the driving wheels and the position of the two-armed lever relative to the frame 1, 2. If the two-armed lever 7 is locked in the position illustrated in FIG. 1 and the driving wheels 8a and 8b are synchronously operated in the same direction an approximately straight forward and backward driving of the undercarriage will be obtained, as indicated by the double arrow 27 in FIG. 1. If the driving wheels 8a and 8b are driven nonsynchronously, i.e. with different speeds, in the same direction of rotation or are driven in opposite directions, the complete undercarriage may be turned with a larger or lesser radius depending on the difference in speed between the driving wheels 8a and 8b. It is to be understood that the smallest turning radius will be achieved when the driving wheels 8a and 8b are driven with the same speed, but in opposite directions of rotation.

When the two-armed lever 7 is released, i.e. when the operating means 24 receives a signal from the user, and the motors 11a and 11b are driven synchronously in opposite directions of rotation a swinging of the lever 7 relative to the frame members 1 and 2 may be achieved, that is the frame members 1 and 2 remain stationary whilst the two-armed lever 7 with its driving wheels 8a and 8b turns about the axis C of the sleeve 3 until it adopts a new position, for example as indicated in dotted lines in FIG. 1. This motion may be completely obtained by operating the above mentioned turning switch. Subsequent to the locking of the lever 7 in this position the undercarriage may for example be driven sideways in one or the other direction as indicated by the dotted double arrow 28 in FIG. 1. This may be appropriate if the frame is used as an undercarriage for a wheeled chair or for a warehouse waggon for collecting picking goods in a storage, since it is then often desirable to drive transversely to the direction in which the user is sitting. For example, such a driving to one or the other side may be of interest when entering storage racks or driving along a worktable where the driving direction of the vehicle is to be altered, but the frame members 1 and 2 are not to follow this alteration.

It is of importance that the supporting wheels 4 are castors having a swivel axis on the frame members 1 and 2 which is offset relative to the rotating axis of the castors. It is thereby avoided that the castor wheels prevent driving of the undercarriage when they—because of a turning of the lever or driving wheel shaft 7—are positioned transversely to the driving direction, as is the case in the position of the lever 7 illustrated in dotted lines in FIG. 1. Further, it is of importance that the driving wheels 8a and 8b during a turning movement of the lever 7 can be moved freely without interfering with the supporting wheels 4, regardless the position thereof. In FIG. 1 this condition is illustrated by a larger circle 29 and smaller circles 30.

It is to be understood that the present invention can be carried out in other manners than the above described. For example, after the release of a locking the frame members 1 and 2 may be turned about the sleeve 3 in order to move the members 1 and 2 into approximately the same plane. This may for example be of value during transportation of partly assembled undercarriages.

Figure 5:
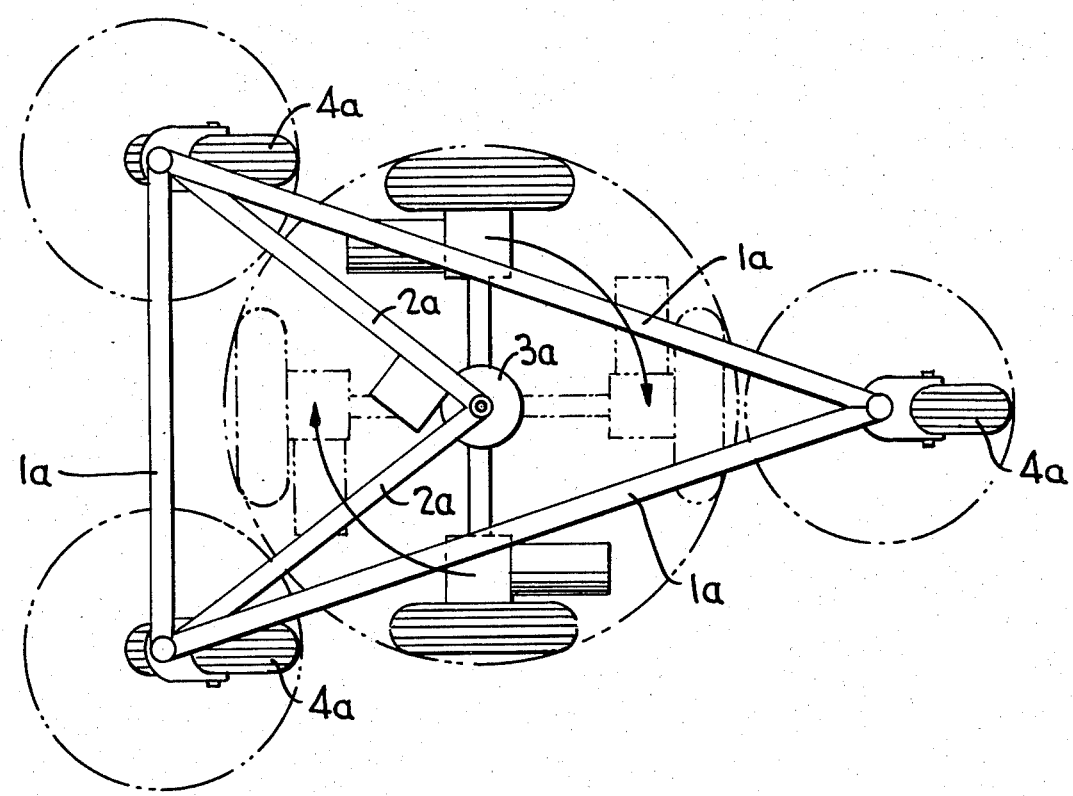
FIGS. 5 and 6 show an alternative embodiment of the invention.
Figure 6:
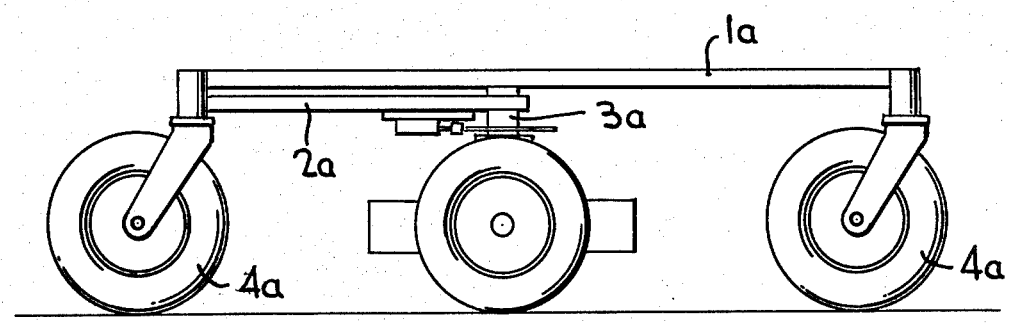

Further, another embodiment of the undercarriage according to the invention may consist in letting the frame comprise members which substantially form a triangle, a castor as described above being mounted at each corner of the triangle. It is to be understood that also in case of a triangle-shaped frame it must be observed that the supporting wheels cannot interfere with the movement of the driving wheels during the turning of the driving wheel shaft. Elements 1a, 2a, 3a and 4a of FIGS. 5 and 6 correspond to the same unlettered components of FIGS. 1 and 2.

It is further to be understood that the driving means for the driving wheels may be hydraulic motors and that pumps for providing the necessary pressure for the hydraulic medium may be driven manually.

Of course, the locking means may be constructed in several other manners than described above. For example, the disc 14 may be replaced by two bolts arranged 90° apart and extending horizontally from the lower portion 13a of the shaft 13. The bolts may engage separate notches in a locking member which is rotatably mounted about a horizontal axis on the frame and can be locked in two different positions for holding the first or the second bolt. Upon a signal from the user the locking member may be released. The locked bolt will then be released from the locking member, and the driving wheel shaft is thereby allowed to be turned to a new position in which the second bolt comes into locking engagement with the locking member.

One or more of the driving wheels or the castors may be resiliently mounted, so that all wheels will always be in contact with the foundation. Such an elastic mounting is also favourable when the wheels are to pass small obstacles on the foundation. A resilient mounting can also be achieved by making the structural members 1 and 2 resilient.

What I claim is:

1. A controllable, motor-driven undercarriage, comprising a first load-carrying frame having freely rotatable supporting wheels and a second frame having traction wheels, said frames being mounted about a vertical center axis for relative rotary motion with respect to one another, said second frame is a two-armed lever which at each end carries a traction wheel and an independently controllable driving means connected to each said traction wheel, and locking means for selectively locking said first frame and said two-armed lever relative to one another in various lockable rotatable positions about said vertical center axis.

2. A device as claimed in claim 1, wherein said locking means has a locked position for maintaining said two-armed lever in given positions relative to said first frame, and an unlocked position enabling rotation of said two-armed lever about said center axis.

3. An undercarriage comprising:
   a first load-carrying frame including at least three swivelable freely rotating support wheels spaced about a vertical center axis;
   a second frame comprising a two-armed lever having a central pivot point coinciding with said vertical center axis, said two-armed lever being provided at each end with a traction wheel having individual, independently controllable traction means;
   a locking means provided adjacent said central pivot point, said locking means in locked position permitting traction of the interlocked frames in a direction determined by the individual reversible speed of the traction wheels, and said locking means in an unlocked position permitting turning of said two-armed lever in a direction determined by the opposite direction of rotation of the individual traction wheels so as to bring the two-armed lever in another locked position relative to said first frame, which permit traction of the two interlocked frames.

4. A device as claimed in claim 3, wherein said locking means comprises a disc having circumferential notches, a locking arm, one end of which is pivotally secured to said first frame and the other end of which carries a locking disc which matches said notches, said locking arm being connected to an actuating means which by control signals can engage or disengage said locking disc with one of said notches.

5. A device as claimed in claim 3, wherein said two-armed lever is mounted below said first frame comprising members which substantially define a triangle, and said freely rotatable supporting wheels are provided at each corner of the triangle.

6. A device as claimed in claim 1 or 3, wherein said first frame comprises two elongated structural members which intersect in the area of a vertical shaft extending along said vertical center axis, one of said rotatable supporting wheels being mounted at each free end of said members.

7. A device as claimed in claim 6, wherein said structural members are detachably secured to a socket mounted on said vertical center axis, so that the angle between said structural members may be altered as desired.

8. A device as claimed in claim 5, wherein said structural members are resilient.

9. A device as claimed in claim 3, wherein said supporting wheels are castor wheels each having a pivot point on said frame members and being offset relative to the respective rotating axis of each said castor wheel.

10. A device as claimed in claim 9, wherein the largest circle described by the traction wheels upon turning of said two-armed lever, lies inside the circles described by said supporting wheels when pivoting about said pivot points on said first frame members.

11. A device as claimed in claim 1, wherein said two-armed lever is mounted in a U-shaped downwardly open attachment yoke rotatable about said vertical center axis together with said two-armed lever, and said two-armed lever is mounted in said attachment yoke on a through-going substantially horizontal bolt, so that said two-armed lever can turn about said bolt until it abuts against a portion of said attachment yoke.

* * * * *